(12) United States Patent
Forliti et al.

(10) Patent No.: US 9,109,894 B2
(45) Date of Patent: Aug. 18, 2015

(54) GYROSCOPE SHOCK AND DISTURBANCE DETECTION CIRCUIT

(71) Applicant: Maxim Integrated Products, Inc., San Jose, CA (US)

(72) Inventors: Massimiliano Forliti, Viareggio (IT); Christian Rosadini, Calcinaia (IT)

(73) Assignee: Maxim Integrated Products, Inc., San Jose, CA (US)

( * ) Notice: Subject to any disclaimer, the term of this patent is extended or adjusted under 35 U.S.C. 154(b) by 235 days.

(21) Appl. No.: 13/925,741

(22) Filed: Jun. 24, 2013

(65) Prior Publication Data

US 2014/0318243 A1      Oct. 30, 2014

Related U.S. Application Data

(60) Provisional application No. 61/816,419, filed on Apr. 26, 2013.

(51) Int. Cl.
*G01C 19/00* (2013.01)
*G01C 19/5719* (2012.01)

(52) U.S. Cl.
CPC .................................. *G01C 19/5719* (2013.01)

(58) Field of Classification Search
CPC . G01C 19/5719; G01P 3/495; A63B 2220/40
USPC .............. 73/504.02, 496, 488, 503.3, 504.18, 73/514.13, 514.14, 739, 504.04, 504.12, 73/504.13, 504.15, 504.08
See application file for complete search history.

(56) References Cited

U.S. PATENT DOCUMENTS

| | | | |
|---|---|---|---|
| 7,840,369 B2* | 11/2010 | Lee et al. | 702/145 |
| 8,156,806 B1* | 4/2012 | Cardarelli | 73/511 |
| 2004/0237626 A1* | 12/2004 | Challoner et al. | 73/1.38 |
| 2006/0009946 A1* | 1/2006 | Betz et al. | 702/145 |
| 2008/0190200 A1* | 8/2008 | Caminada et al. | 73/504.12 |
| 2009/0205436 A1* | 8/2009 | Garverick et al. | 73/777 |
| 2009/0217757 A1* | 9/2009 | Nozawa | 73/504.12 |
| 2009/0223276 A1* | 9/2009 | Rudolf et al. | 73/1.37 |
| 2012/0092676 A1* | 4/2012 | Wang et al. | 356/461 |

* cited by examiner

*Primary Examiner* — Lisa Caputo
*Assistant Examiner* — Nigel Plumb
(74) *Attorney, Agent, or Firm* — North Weber & Baugh LLP

(57) ABSTRACT

The invention relates to integrated circuits, and more particularly, to systems, devices and methods of integrating a gyro sensing circuit with a gyroscope to detect a shock or a disturbance, and accurately differentiate rotation-based sense signals from noises introduced by the shock or disturbance. The gyro sensing circuit may be implemented in a differential or non-differential demodulation scheme, and comprises at least one demodulation unit and a peak detector. The at least one demodulation unit demodulates a gyro output signal provided by the gyroscope with a reference signal. In a demodulated gyro output signal, a shock signal or a gyro disturbance signal is substantially isolated out from interested gyro sense signals that are used to sense a rate of rotation. A peak detector samples the modulated gyro output signal, determines whether the signal exceeds a threshold level $V_{TH}$ and outputs a shock flag indicating a corresponding determination result.

20 Claims, 9 Drawing Sheets

150

100

150

200

300

GYROSCOPE SHOCK AND DISTURBANCE DETECTION CIRCUIT

CROSS REFERENCE TO RELATED APPLICATION

The application claims the benefit under 35 U.S.C. §119(e) of Provisional Application Ser. No. 61/816,419, entitled "Gyroscope Shock and Disturbance Detection Circuit," filed on Apr. 26, 2013, the subject matter of which is incorporated herein by reference in its entirety.

BACKGROUND

A. Technical Field

The present invention relates to integrated circuits, and more particularly, to systems, devices and methods of detecting a shock or a disturbance experienced by a gyroscope and differentiating rotation-based sense signals from noises introduced by the shock or disturbance.

B. Background of the Invention

A microelectromechanical structure (MEMS) is widely applied as a sensor to measure acceleration, rotation, pressure and many other physical parameters. The MEMS device is normally formed on a silicon substrate using a micromachining process, adopts characteristic feature sizes of several micrometers, and transduces mechanical movement to electrical signals that may indicate the level of an interested parameter. In particular, MEMS-based gyroscope devices have been developed and applied to monitor rotational rates of the devices with respect to certain axes, and a multitude of consumer and automotive applications have successfully adopted such MEMS-based gyroscope devices. For instance, many automotive integrate the gyroscope devices for vehicle stability control, navigation assist, load leveling/suspension control, collision avoidance and roll over detection.

Conventional MEMS-based gyroscope devices use vibrational mechanical elements (proof masses) to sense a rate of rotation. FIG. 1A illustrates a mechanical element 100 disposed in a rotating reference frame. The mechanical element 100 is driven to oscillate in a first orthogonal axis (x-axis), and as the frame rotates with respect to a second orthogonal axis (y-axis), vibratory movement is induced along the third orthogonal axis (z-axis) due to Coriolis acceleration. A corresponding inertial Coriolis force $F_C$ may be represented as:

$$F_C = -2\Omega m v \quad (1)$$

where $\Omega$ is the rate of rotation, m is the mass of the mechanical element 100 and v is the vibrational velocity along the first orthogonal axis.

FIG. 1B illustrates an exemplary vibratory gyroscope device 150 that relies on electrostatic actuation and capacitive sensing to detect the Coriolis force. A proof mass 152 is driven to vibrate along an x-axis by comb drivers 154 arranged at two opposing sides. A capacitor is formed between the substrate and the proof mass 152. In response to rotation with respect to a y-axis, the proof mass 152 vibrates towards and away from a substrate that the gyroscope device 150 is situated on, and therefore, the gap distance of the capacitor varies, leading to a capacitive variation that is associated with the Coriolis force. An interface readout circuit is normally integrated with the gyroscope device 150 to convert this capacitive variation to a gyroscope sense signal that is related to the magnitude of the Coriolis force and therefore to the corresponding rate of rotation.

Although the gyroscope sense signal includes interested information related to the rate of rotation, noises are also introduced by various shock and disturbance sources and could significantly compromise the accuracy of rotation sensing. Particularly in automotive applications, shock robustness is critical and constitutes a key characteristic, because strict safety constraints have to be imposed to ensure a failsafe and robust system. In such a context, an occurrence of shock or disturbance needs to be flagged and used to indicate that an unreliable and unpredictable rate signal is outputted, when the level of the shock or disturbance exceeds a threshold value tolerable by a corresponding rotation sensing system. Many existing gyroscope devices in the market have adopted sensor or package solutions to improve shock robustness of the devices themselves. However, none of them flags the occurrence of shock or disturbance with respect to a certain tolerance, and warns a host to take suitable countermeasures.

SUMMARY OF THE INVENTION

Various embodiments of the invention relate to integrated circuits, and more particularly, to systems, devices and methods of integrating a gyro sensing circuit with a gyroscope to detect a shock or a disturbance experienced by a gyroscope device and accurately differentiate rotation-based gyro sense signals from noises introduced by the shock or disturbance. The gyro sensing circuit specifically takes advantages of the symmetry of these signals with respect to a characteristic frequency of the gyroscope.

In accordance with one embodiment of the invention, a gyro sensing circuit is implemented based on a differential demodulation scheme. Two demodulate units are applied to demodulate a gyro output signal that comprises a shock signal and a plurality of gyro sense signals. Two reference signals that are symmetric with respect to the characteristic frequency are used for the demodulation, and the resulting demodulated gyro outputs are differentially combined in a subtractor to isolate the shock signal that is asymmetric with respect to the characteristic frequency. A peak detector further determines whether the combined gyro output exceeds a threshold level, and generates a shock flag to alert a host whether an anomalous shock or disturbance situation occurs.

In accordance with another embodiment of the invention, a gyro sensing circuit is implemented based on a non-differential demodulation scheme. The gyro sensing circuit comprises a demodulation unit and a peak detector. The demodulation unit is first coupled to receive a gyro output signal that comprises a gyro sense signal and at least one of a shock signal and a plurality of gyro disturbance signals from a gyroscope. Such a gyro output signal is demodulated using a reference signal, such that the at least one of the shock signal and the plurality of gyro disturbance signals is retained while the gyro sense signal that is related to an interested rate of rotation is suppressed. The peak detector determines whether the demodulated gyro output exceeds a threshold level and generates a shock flag to alert a host whether an anomalous shock or disturbance situation occurs.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1A:
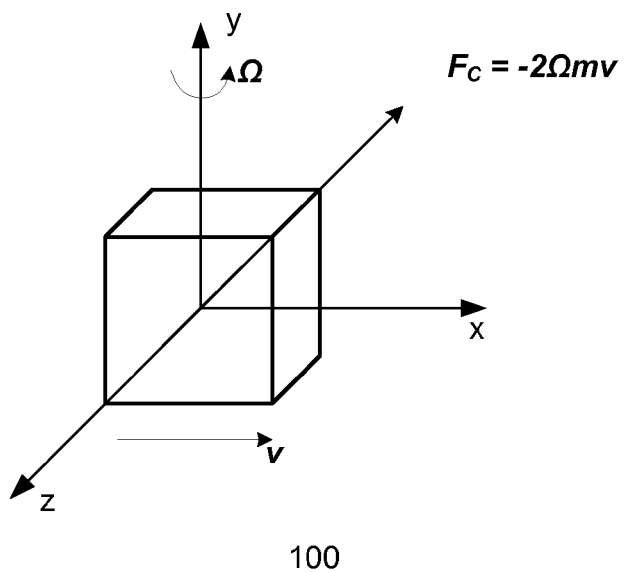
FIG. 1A illustrates a mechanical element disposed in a rotating reference frame.
Figure 1B:
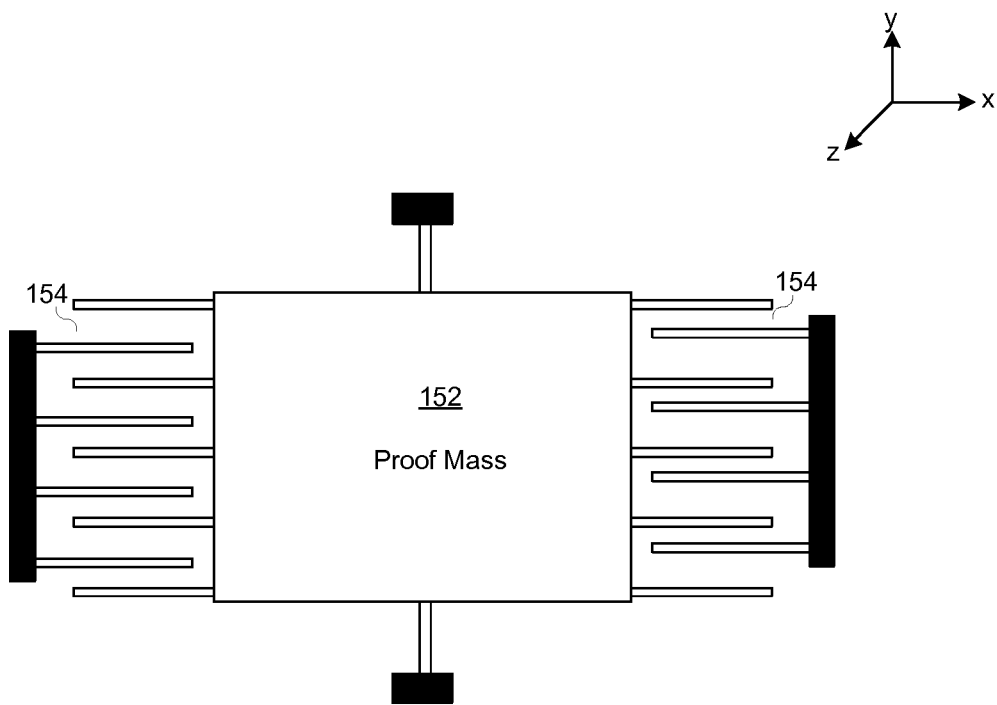
FIG. 1B illustrates an exemplary vibratory gyroscope device that relies on electrostatic actuation and capacitive sensing to detect a Coriolis force.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the invention relate to integrated circuits, and more particularly, to systems, devices and methods of integrating a gyro sensing circuit with a gyroscope to detect a shock or a disturbance experienced by a gyroscope device and accurately differentiate rotation-based gyro sense signals from noises introduced by the shock or disturbance. In addition to the rotation-based gyro sense signals, gyro disturbance signals or a shock signal may be incorporated in a gyro output signal provided by the gyroscope device to the gyro sensing circuit, but these signals have different frequency magnitudes and characteristics. When the shock signal exceeds a threshold level, the gyro output signal is corrupted, and a rate of rotation derived from the gyro output signal is not reliable any more. Sometimes, the gyro output signal is also regarded as corrupted when one of the gyro disturbance signals exceeds the threshold level.

In accordance with the invention, the gyro sensing circuit is configured according to a differential or non-differential demodulation scheme, and applies at least one reference signal to demodulate the gyro output signal. The reference frequency of the at least one reference signal is selected according to the frequencies of the shock signal or the gyro disturbance signals, such that the shock or disturbance signals may be separated from the rotation-based gyro sense signals in the gyro output signal. The shock or disturbance signals are constantly monitored, and any anomalous situation is flagged out to a host that relies on the gyroscope for rotation sensing. Upon detection of such conditions, the host may take suitable countermeasures, such as ignoring the corrupted gyro output signal, to ensure the accuracy of rotation sensing.

Figure 2:
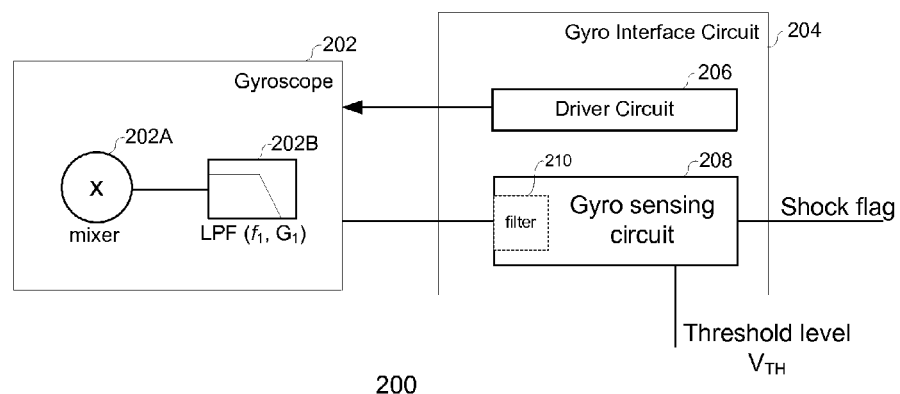
FIG. 2 illustrates an exemplary rotation sensing system according to various embodiments in the invention.

FIG. 2 illustrates an exemplary rotation sensing system 200 according to various embodiments in the invention. The rotation sensing system 200 comprises a gyroscope device 202 and a gyro interface circuit 204 that further comprises a driver circuit 206 and a gyro sensing circuit 208. In accordance with various embodiments of the invention, the gyroscope device 202 is a MEMS device manufactured from a micro-fabrication process. The driver circuit 206 provides a drive signal to electrostatically drive a proof mass included in the gyroscope device 202, and the proof mass is therefore driven to oscillate along a first orthogonal direction in a rotating reference frame. The drive signal preferably has a drive frequency that is consistent with a characteristic frequency $f_0$ of the gyroscope device 202. In response to rotation with respect to a second orthogonal direction, the proof mass oversees a physical displacement along a third orthogonal direction and a corresponding capacitive variation. The gyro sensing circuit 208 is coupled to sense the capacitive variation which is associated with a corresponding Coriolis force along the third orthogonal direction.

The gyroscope 202 provides a gyro output signal to the gyro sensing circuit 204, and this gyro output signal contains gyro sense signals resulting from an interested rotation rate of the gyroscope 202. In a preferred embodiment, the gyro output signal is only associated with the capacitive variation caused by the Coriolis force, and contains only the gyro sense signals. However, in many cases, a shock or disturbance may be incorporated and unavoidably impact the gyro output signal. Therefore, the gyro output signal oftentimes includes a shock signal or gyro disturbance signals induced by the shock or disturbance, respectively.

In accordance with the present invention, the gyro sensing circuit 208 detects and flags an undesirable shock or disturbance in addition to rotation sensing, when a certain shock or disturbance signal contained in the gyro output signal exceeds a threshold level. Under such circumstances, useful information concerning a rate of rotation associated with the gyro output signal is corrupted by the excessive shock or disturbance signal and rendered inaccurate. Accordingly, an application host that adopts the rotation sensing system 200 may rely on a shock flag generated by the gyro sensing circuit 208 to determine whether the gyro output signal needs to be ignored and dissociated from the interested rate of rotation.

The mechanical structure of the gyroscope device 202 may be abstractly represented in theory as a combination of a mixer 202A and a low-pass filter 202B. The mixer 202A mixes the drive signal and the rate of rotation, and generates an intermediate gyro output signal that is associated with the corresponding Coriolis force. The intermediate gyro output signal is further filtered to generate the gyro output signal. The low-pass filter 202B is associated with a transfer function $H_p(s)$ that has a resonance peak at a peak frequency $f_1$. The cut-off frequency of the low-pass filter 202B is substantially consistent with the peak frequency $f_1$. The characteristic frequency $f_0$ of the gyroscope device 202 is smaller than the peak frequency $f_1$, and thus, the gyro output signal may accurately maintain the interested information related to the rate of rotation. In one specific embodiment, the characteristic frequency $f_0$ and the peak frequency $f_1$ are respectively 20 kHz and 21 kHz.

An analog filter 210 may be further disposed at an input of the gyro sensing circuit 208. The analog filter 210 is a low-pass filter used to filter, scale or amplify the gyro output signal prior to any further processing. The analog filter 210 serves anti-aliasing purposes, and does not affect the rotation-related spectrum content of the gyro output signal. Therefore, the cut-off frequency of the analog filter 210 is selected to be larger than both the characteristic frequency $f_0$ and the peak frequency $f_1$. For example, the cut-off frequency of the analog filter 210 may be set as 100 kHz, when the characteristic frequency $f_0$ and the peak frequency $f_1$ of the gyroscope 202 are respectively 20 kHz and 21 kHz.

In some embodiments, the gyro output signal provided by the gyroscope 202 is an analog signal. Upon filtering and scaling/amplification within the analog filter 210, the gyro output signal is converted to a digital signal that may be further processed in a digital domain to obtain the rate of rotation and generate the flag output.

In certain embodiments, the gyroscope device 202 and the gyro interface circuit 204 are manufactured on two separate substrates, and assembled to form the rotation sensing system 200 in a hybrid format. In some other embodiments, the gyroscope device 202 and the gyro interface circuit 204 are manufactured on one single substrate using a micro-fabrication process that involves multiple layers of material. Even though they may occupy distinct chip estates that are physically separated on the substrate, the gyroscope device 202 may also be integrated on top of the gyro interface circuit 204 to save the chip estate. For such a vertical integration, the manufacturing process, the material layers and the configurations of both the gyroscope device 202 and the interface circuit 204 have to be properly arranged.

Figure 3:
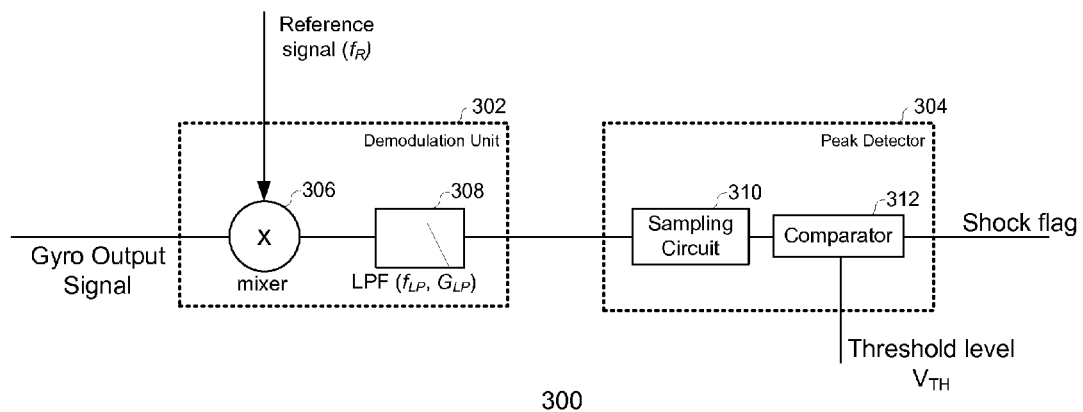
FIG. 3 illustrates an exemplary block diagram of a gyro sensing circuit based on a non-differential demodulation scheme according to various embodiments in the invention.

FIG. 3 illustrates an exemplary block diagram 300 of a gyro sensing circuit based on a non-differential demodulation scheme according to various embodiments in the invention. The gyro sensing circuit 300 generates a shock flag that indicates whether a shock or disturbance signal exceeds a threshold level $V_{TH}$, and therefore, the application host may rely on the shock flag to determine whether the gyro output signal is corrupted and needs to be ignored.

The gyro sensing circuit 300 comprises a demodulation unit 302 and a peak detector 304. The demodulation unit 302 demodulates a gyro output signal using a reference signal, such that the shock or disturbance signal is retained while the gyro sense signals are suppressed within a demodulated gyro output signal. By this means, the shock or disturbance signal is effectively separated out from the gyro sense signals. The peak detector 304 further detects whether the magnitude of the demodulated gyro output signal exceeds a threshold level $V_{TH}$, and generates the corresponding shock flag to alert the host whether an anomalous shock or disturbance situation occurs.

The demodulation unit 302 further comprises an electronic mixer 306 and a low-pass filter 308. The electronic mixer 306 combines the reference signal and the gyro output signal, and varies the spectrum contents of the gyro output signal with respect to a reference frequency $f_R$ of the reference signal. The low-pass filter 308 adopts a gain $G_{LP}$ and a cut-off frequency $f_{LP}$ that are designed to differently process the shock or disturbance signal and the gyro sense signals in the gyro output signal, and in particular, to retain or amplify the level of the shock or disturbance signal while suppressing that of the gyro sense signals. A selection method is applied to determine the reference frequency $f_R$, the cut-off frequency $f_{LP}$ and the gain $G_{LP}$, and a corresponding rationale underneath such a selection method is detailed below in FIGS. 4A-4C and FIGS. 5A-5C.

The peak detector 304 comprises a sampling circuit 310 and a comparator 312. The sampling circuit 310 samples the demodulated gyro output signal received from the demodulation unit 302. The comparator 312 compares the sampled signal with the threshold level $V_{TH}$ and generates the shock flag according to a comparison result.

Figure 4A:
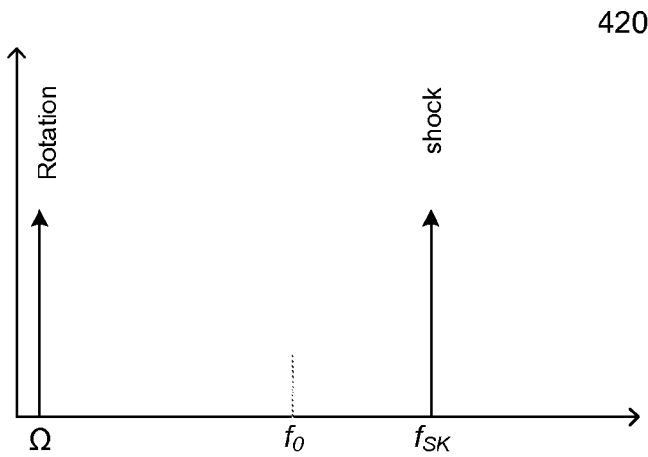
FIG. 4A illustrates a first exemplary spectrum diagram of inputs coupled into a rotation sensing system according to various embodiments in the invention.

FIG. 4A illustrates a first exemplary spectrum diagram 420 of inputs coupled into a rotation sensing system according to various embodiments in the invention. Rotation of the gyroscope device 202 is incorporated via the capacitive variation associated with the Coriolis force, and normally has a relatively low rotation frequency $\Omega$. Such a rotation is directly associated with vehicle motion, when the host is a vehicle, and represents a useful signal that a supplier or a user of a host is interested in. The rate of rotation is normally located at a lower end of the frequency spectrum. In some embodiments, the rotation frequency $\Omega$ may be limited below 300 Hz.

A mechanical shock is normally introduced to the rotation sensing system 200 by acceleration stimuli or generic vibrations that are experienced by the host. The shock is directly incorporated into the gyro output signal without mechanical modulation by the gyroscope device 202. Therefore, a shock frequency $f_{SK}$ associated with the shock is not limited by the low-pass filter 202B, and in certain embodiments, may be higher than the characteristic frequency $f_0$ or the peak frequency $f_1$ of the gyroscope 202. In one embodiment, the shock frequency $f_{SK}$ approximately extends up to 30 kHz, when the characteristic frequency $f_0$ and the peak frequency $f_1$ of the gyroscope 202 are respectively 20 kHz and 21 kHz.

Figure 4B:
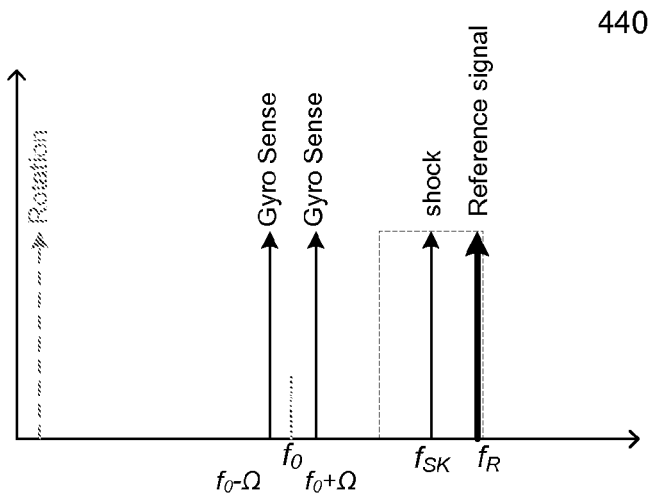
FIG. 4B illustrates a first exemplary spectrum diagram of signal components in a gyro output signal and a reference signal used in a gyro sensing circuit according to various embodiments in the invention.

FIG. 4B illustrates a first exemplary spectrum diagram 440 of signal components in a gyro output signal and a reference signal used in a gyro sensing circuit according to various embodiments in the invention. Based on equation (1), the rotation of the gyroscope 202 is modulated to two gyro sense signals that are symmetric around the characteristic frequency $f_0$. Two sense frequencies of these two gyro sense signals are respectively $f_0-\Omega$ and $f_0+\Omega$, and in certain embodiments, the sense frequencies may range from DC to 15 kHz. On the other hand, the shock signal is not modulated by the gyroscope 202, and directly incorporated into the gyro output signal. The first gyro sense signal, the second gyro sense signal and the shock signal constitute the signal components of the gyro output signal received from the gyroscope 202.

In view of the signal components, the reference frequency $f_R$ of the reference signal is particularly selected to be closer to the shock frequency $f_{SK}$ than to either of the two gyro sense frequencies $f_0-\Omega$ and $f_0+\Omega$. On one hand, the reference frequency $f_R$ also needs to be sufficiently far from the peak frequency $f_1$ of the gyroscope 202. This is particularly due to the fact the peak frequency $f_1$ is associated with an intrinsic vibrational mode of the gyroscope 202 and that a spurious amplified response may be undesirably produced around this peak frequency $f_1$. On the other hand, the reference frequency $f_R$ is not so far from the shock frequency that a response from the shock signal could be compromised as well In certain embodiments, the shock signal is not limited to one single frequency, and the shock frequency $f_{SK}$ is associated with a bandwidth $BW_{SK}$. The reference frequency $f_R$ is still similarly determined as above, but particularly selected to be close to or within the frequency span of the shock frequency $f_{SK}$.

Figure 4C:
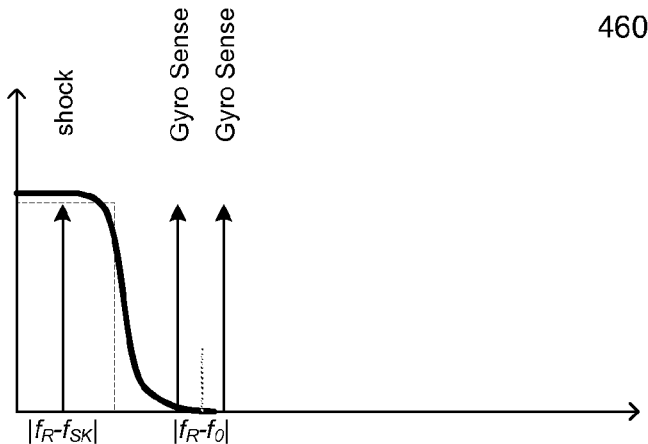
FIG. 4C illustrates an exemplary spectrum diagram that indicates a mechanism to separate a shock signal from two gyro sense signals in a gyro output signal according to various embodiments in the invention.

FIG. 4C illustrates an exemplary spectrum diagram 460 that indicates a mechanism to separate the shock signal from the two gyro sense signals according to various embodiments in the invention. The shock signal and the two gyro sense signals are converted with respect to the reference signal, and change to different frequencies from their original frequencies in the electronic mixer 306. The characteristic frequency $f_0$ is converted to a demodulated characteristic frequency $|f_R-f_0|$. Likewise, the modulated frequencies of the shock signal and the two gyro sense signals are $|f_R-f_{SK}|$, $|f_R-(f_0-\Omega)|$ and $|f_R-(f_0+\Omega)|$, respectively. The absolute values are applied, because in some embodiments, the reference frequency $f_R$ is smaller than the shock frequency $f_{SK}$ or the gyro sense frequency $f_0-\Omega$.

In this embodiment, the reference frequency $f_R$ is larger than both the shock frequency $f_{SK}$ and the gyro sense frequencies $f_0-\Omega$ and $f_0+\Omega$. The modulated frequencies of the shock signal and the two gyro sense signals may be simply represented as $f_R-f_{SK}$, $f_R-(f_0-\Omega)$ and $f_R-(f_0+\Omega)$, respectively The cut-off frequency $f_{LP}$ of the low-pass filter 308 is controlled between the modulated shock frequency $|f_R-f_{SK}|$ and the modulated gyro sense frequencies, i.e., $|f_R-(f_0-\Omega)|$ and $|f_R-(f_0+\Omega)|$. The level of the shock signal is retained or amplified by the gain $G_{LP}$. On the opposite, the first and second gyro sense signals are depressed. Upon such modulations based on mixing and low pass filtering, the shock signal in the gyro output signal is separated, and the peak detector 304 may further determine whether the shock signal exceeds the threshold level $V_{TH}$.

One of those skilled in the art knows that the gyro sensing circuit 300 is preferably applied when the shock signal is not modulated by the gyroscope device 202 and relatively distant from the gyro sense signals on the frequency spectrum. The difference between the shock frequency $f_{SK}$ and the sense frequencies $f_0\pm\Omega$ needs to be sufficiently large, such that the cut-off frequency $f_{LP}$ may be controlled to a magnitude in between of them.

The modulation method based on one demodulation unit 302 is not applicable when the shock frequency $f_{SK}$ is substantially close to either of the sense frequencies $f_0-\Omega$ and $f_0+\Omega$ in FIG. 4C. Substantial closeness of the shock frequency with another frequency is determined based on whether the cut-off frequency $f_{LP}$ of the low-pass filter 308 may be engineered to differentiate the corresponding modulated frequencies. To be specific, in one embodiment associated with FIG. 4C, a challenge occurs for the gyro sensing circuit 300 that is based on a single modulation unit 302, when the modulated shock frequency $f_R-f_{SK}$ and the modulated gyro sense frequency $f_R-f_0-\Omega$ is so close that the low-pass filter 308 may not be easily engineered to differentiate them.

However, in some embodiments, the gyroscope 202 may further couple rotational disturbance besides the interested rotation of the host. When the host is a vehicle, such rotational disturbance may result from internal vehicle vibration or parasitic vibration of a gyroscope package. In particular, the rotational disturbance is modulated by the gyroscope 202 to generate gyro disturbance signals that have symmetric disturbance frequencies with respect to the characteristic frequency $f_0$.

Figure 5A:
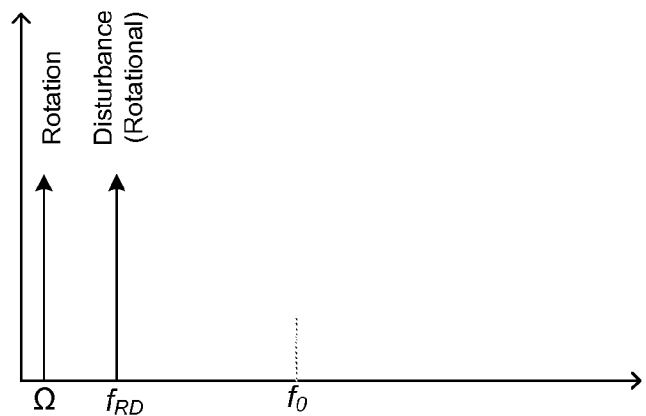
FIG. 5A illustrates a second exemplary spectrum diagram of inputs coupled into a rotation sensing system according to various embodiments in the invention.

FIG. 5A illustrates a second exemplary spectrum diagram 520 of inputs coupled into a rotation sensing system according to various embodiments in the invention. In addition to interested rotation, a rotational disturbance to the gyroscope device 202 is also incorporated via the capacitive variation associated with the Coriolis force. Such a rotational disturbance has a disturbance frequency $f_{RD}$ that is normally located within an intermediate frequency range, e.g., 1-5 kHz. In many embodiments, the disturbance frequency $f_{RD}$ is smaller than the characteristic frequency $f_0$ of the gyroscope 202.

Figure 5B:
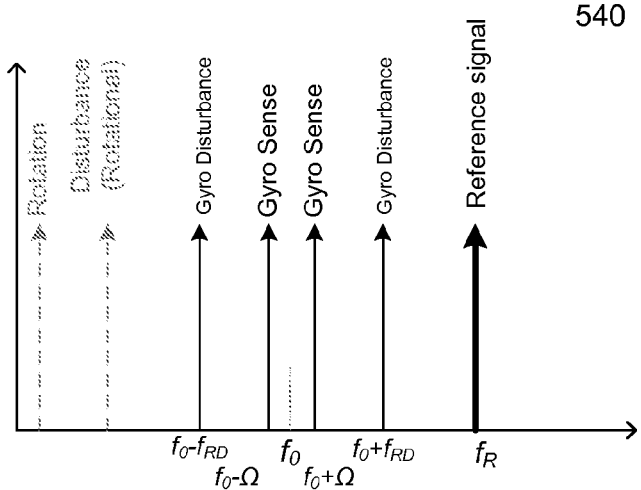
FIG. 5B illustrates a second exemplary spectrum diagram of signal components in a gyro output signal and a reference signal used in a gyro sensing circuit according to various embodiments in the invention.

FIG. 5B illustrates a second exemplary spectrum diagram 540 of signal components in a gyro output signal and a reference signal used in a gyro sensing circuit according to various embodiments in the invention. Similarly, the rotational disturbance of the gyroscope 202 is modulated to two gyro disturbance signals that are symmetric with respect to the characteristic frequency $f_0$. Two gyro disturbance frequencies of these two gyro disturbance signals are respectively $f_0-f_{DR}$ and $f_0+f_{DR}$. These two gyro disturbance signals and the two gyro sense signals constitute the signal components in the gyro output signal received from the gyroscope 202. The gyro disturbance signals are further apart from the characteristic frequency $f_0$ compared with the gyro sense signals, because the rotational disturbance normally has a higher frequency than that of the interested rotation itself.

In view of these signal components, the reference frequency $f_R$ of the reference signal is particularly selected to be closer to either of the two gyro disturbance frequencies $f_0-f_{DR}$ and $f_0+f_{DR}$ than to both gyro sense frequencies $f_0-\Omega$ and $f_0+\Omega$. To be specific, the reference frequency $f_R$ may be selected to be smaller than the characteristic frequency $f_0$, and therefore, closer to the gyro disturbance frequency $f_0-f_{DR}$ than to the gyro sense frequency $f_0-\Omega$. Otherwise, the reference frequency $f_R$ may be selected to be larger than the characteristic frequency $f_0$, and therefore, closer to the gyro disturbance frequency $f_0+f_{DR}$ than to the gyro sense frequency $f_0+\Omega$.

Nevertheless, the reference frequency $f_R$ needs to be sufficiently far from the peak frequency $f_1$ of the gyroscope 202 to avoid undesirable amplification that is associated with the intrinsic vibrational mode of the gyroscope at this peak frequency. On the other hand, this reference frequency $f_R$ is not so far from one of the gyro disturbance frequencies that a response from the disturbance signal could be compromised.

Figure 5C:
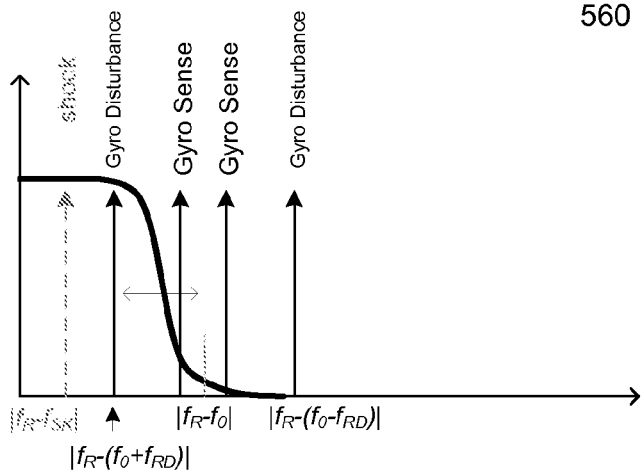
FIG. 5C illustrates an exemplary spectrum diagram that indicates a mechanism to separate one of two gyro disturbance signals from the two gyro sense signals in a gyro output signal according to various embodiments in the invention.

FIG. 5C illustrates an exemplary spectrum diagram 560 that indicates a mechanism to separate one of the two gyro disturbance signals from the two gyro sense signals according to various embodiments in the invention. The two gyro disturbance signals and the two gyro sense signals are converted with respect to the reference signal $f_R$, and change to different frequencies from their original frequencies in the electronic mixer 306. As a result, the modulated frequencies of the two gyro disturbance signals are $|f_R-(f_0-f_{RD})|$ and $|f_R-(f_0+f_{RD})|$, respectively, while the modulated frequencies of the two gyro sense signals are $|f_R-(f_0-\Omega)|$ and $|f_R-(f_0+\Omega)|$, respectively. The absolute values are applied, because in some embodiments, the reference frequency $f_R$ is smaller than either of the gyro disturbance frequencies $f_0 \pm f_{RD}$ or either of the gyro sense frequencies $f_0 \pm \Omega$.

In this embodiment, the reference frequency $f_R$ is larger than the gyro disturbance frequencies $f_0 \pm f_{RD}$ and the gyro sense frequencies $f_0 \pm \Omega$. The modulated frequencies of the gyro disturbance signal and the two gyro sense signals may be simply represented as $f_R-(f_0-f_{RD})$ and $f_R-(f_0+f_{RD})$, $f_R-(f_0-\Omega)$ and $f_R-(f_0+\Omega)$, respectively.

The cut-off frequency $f_{LP}$ of the low-pass filter 308 is controlled between a smaller frequency of the modulated gyro disturbance frequencies i.e., $|f_R-(f_0-f_{RD})|$ and $|f_R-(f_0+f_{RD})|$, and a smaller frequency of the modulated gyro sense frequencies, i.e., $|f_R-(f_0-\Omega)|$ and $|f_R-(f_0+\Omega)|$. The level of one gyro disturbance signal is retained or amplified by the gain $G_{LP}$, and on the opposite, the other gyro disturbance signal and the two gyro sense signals are depressed. Upon such modulation based on mixing and low pass filtering, one gyro disturbance signal in the gyro output signal is isolated out, and the peak detector 304 may further determine whether this isolated gyro disturbance signal exceeds the threshold level $V_{TH}$.

One of those skilled in the art knows that the gyro sensing circuit 300 is preferably applied when the gyro disturbance signals are relatively distant from the gyro sense signals on the frequency spectrum. The difference between the disturbance frequency $f_{RD}$ and the rotation frequency $\Omega$ needs to be sufficiently large, such that the cut-off frequency $f_{LP}$ may be controlled to a magnitude in between of them. Therefore, the modulation method based on one demodulation unit 302 is not applicable when the disturbance frequency $f_{RD}$ is substantially close to the sense frequency $\Omega$ in FIG. 5C. Substantial closeness of the shock frequency with another frequency is determined based on whether the cut-off frequency $f_{LP}$ of the low-pass filter 308 may be engineered to differentiate the corresponding modulated frequencies. To be specific, in one embodiment associated with FIG. 5C, a challenge occurs for the gyro sensing circuit 300 that is based on a single modulation unit 302, when the modulated gyro disturbance frequency $f_R-f_0-f_{RD}$ and the modulated gyro sense frequency $f_R-f_0-\Omega$ is so close that the low-pass filter 308 may not be easily engineered to differentiate them.

In certain embodiments, the shock signal may also co-exist with the gyro disturbance signals, and a similar modulation method may be applied to isolate the shock signal only or isolate both the shock signal and one of the gyro disturbance signals.

However, the modulation method based on one demodulation unit 302 is also not applicable, when the shock frequency $f_{SK}$ is substantially close to one of the gyro disturbance frequencies $f_0 \pm f_{RD}$ in FIG. 5C, and when the shock signal has to be differentiated from the gyro disturbance signals. The gyro sensing circuit 300 that is based on one demodulation unit 302 may fail to output a correct shock flag under this circumstance. Although the gyro disturbance signals are acceptable by the rotation sensing system 200 and the host, the gyro disturbance frequency $f_0+f_{RD}$ may be so close to the shock frequency $f_{SK}$ that the gyro sensing circuit 300 regards the gyro disturbance signals as the shock signal and issues an erroneous shock flag.

In various embodiments associated with FIGS. 4A-4C and 5A-5C, the reference signal may be selected at a single reference frequency $f_R$, and however, each of the other signals related to the gyro sense signals, the gyro disturbance signals and the shock signal may be associated with a respective frequency bandwidth. Regardless of their bandwidths, the gyro sense signals and the shock signal are simply represented around their respective central frequencies. In these figures, heights of corresponding arrowed lines are not presented in a proportional format to the actual magnitudes of these signals.

Figure 6:
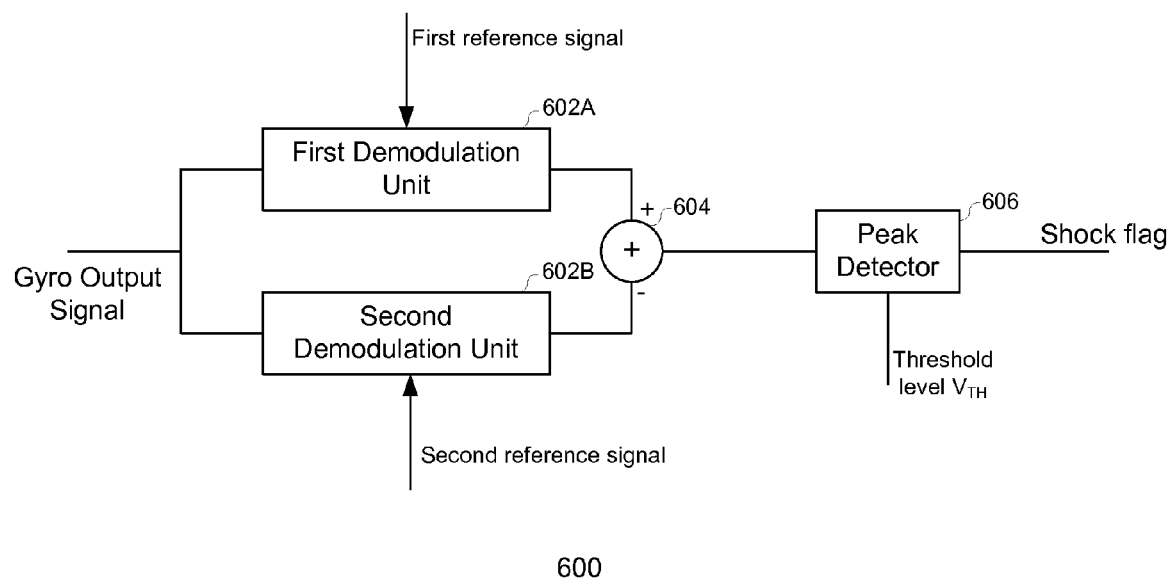
FIG. 6 illustrates an exemplary block diagram of a gyro sensing circuit based on a differential demodulation scheme according to various embodiments in the invention.

FIG. 6 illustrates an exemplary block diagram 600 of a gyro sensing circuit based on a differential demodulation scheme according to various embodiments in the invention. The gyro sensing circuit 600 includes two demodulation units 602A and 602B that respectively demodulate the gyro output signals at two reference signals $f_{R1}$ and $f_{R2}$, compensate the magnitudes of the gyro output signals as needed and band-limit the gyro output signals. In particular, the two reference signals are symmetric with respect to the characteristic frequency $f_0$, and may thus be represented as $f_0-\Delta f_R$ and $f_0+\Delta f_R$, respectively. The demodulated gyro output signals are further combined differentially by a subtractor 604. A peak detector 606 further detects whether the magnitude of the combined output signal exceeds a threshold level $V_{TH}$, and generates a corresponding shock flag to alert the host whether an anomalous shock or disturbance situation occurs.

Such a differential demodulation method is applied to address the above challenges in the non-differential demodulation scheme, when the shock frequency $f_{SK}$ of the shock signal is close to any frequency of the gyro sense signals or the gyro disturbance signals. This method takes advantages of the symmetric nature of both the gyro sense signals and the gyro disturbance signals. These symmetric signals, once demodulated by symmetric reference signals, may substantially cancel off each other via differential combination in the subtractor 604. As a result, the shock signal may be detected with an enhanced immunity to vibrational sense or disturbance signals coupled in the gyro output signal.

Figure 7A:
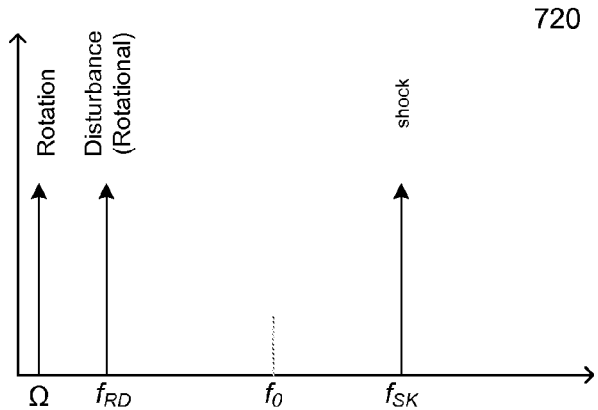
FIG. 7A illustrates a third exemplary spectrum diagram of inputs coupled into a rotation sensing system according to various embodiments in the invention.

FIG. 7A illustrates a third exemplary spectrum diagram 720 of inputs coupled into a rotation sensing system according to various embodiments in the invention. In addition to interested rotation of the gyroscope 202, both a rotational disturbance and a shock may be incorporated into the gyro output signal. In various embodiments, the disturbance frequency $f_{RD}$ of the rotational disturbance may be located within an intermediate frequency range, e.g., 1-5 kHz, while the shock frequency $f_{SK}$ of the shock may have a higher frequency. The characteristic frequency $f_0$ of the gyroscope 202 may be located in between of the disturbance frequency $f_{RD}$ and the shock frequency $f_{SK}$.

Figure 7B:
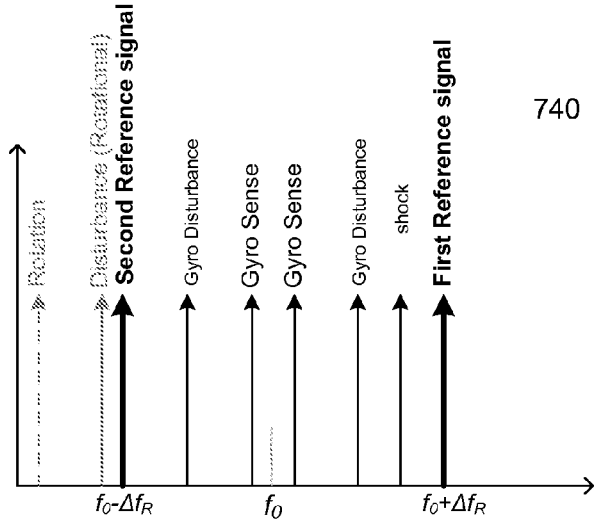
FIG. 7B illustrates an exemplary spectrum diagram of signal components in a gyro output signal and two reference signals used in a gyro sensing circuit according to various embodiments in the invention.

FIG. 7B illustrates an exemplary spectrum diagram 740 of signal components in a gyro output signal and two reference signals used in a gyro sensing circuit according to various embodiments in the invention. The interested rotation of the gyroscope 202 is coupled based on the Coriolis force, and modulated to two gyro sense signals that are symmetric with respect to the characteristic frequency $f_0$. Similarly, the rotational disturbance to the gyroscope 202 is also modulated to two gyro disturbance signals that are symmetric with respect to the characteristic frequency $f_0$. These two gyro disturbance signals and the two gyro sense signals constitute the signal components in the gyro output signal provided to the rotation sensing system 200. In some embodiments, the gyro disturbance signals may be further apart from the characteristic frequency $f_0$ compared with the gyro sense signals.

In addition to the gyro sense and disturbance signals, the gyro output signal further comprises a shock signal that has a shock frequency $f_{SK}$. This shock signal is not modulated by the gyroscope 202 and is directly incorporated into the gyro output signal. Therefore, the shock signal is not symmetric with respect to the characteristic frequency $f_0$.

In view of these signal components, two reference signals are applied to demodulate the gyro output signal in the gyro sensing circuit 600. The first reference signal used by the first demodulation unit 602A has a first reference frequency $f_{R1}$ that is larger than the characteristic frequency $f_0$ by $\Delta f_R$, and the second reference signal used by the second demodulation unit 602B has a second reference frequency $f_{R2}$ that is smaller than the characteristic frequency $f_0$ by $\Delta f_R$. As a result, the reference signals, the gyro sense signals and the gyro disturbance signals are symmetric with respect to the characteristic frequency $f_0$ except the shock signal.

The first reference frequency $f_{R1}$ of the first reference signal is selected to be closer to the shock signal and the gyro disturbance frequency $f_0+f_{DR}$ than to the gyro sense frequency $f_0+\Omega$, and the second reference frequency $f_{R2}$ is therefore closer to the gyro disturbance frequency $f_0-f_{DR}$ than to the gyro sense frequencies $f_0-\Omega$. The reference frequencies $f_{R1}$ and $f_{R2}$ need to be sufficiently far from the peak frequency $f_1$ of the gyroscope 202 due to the undesirable intrinsic vibrational mode at this peak frequency, while not being so far that responses from the shock signal and the gyro disturbance signals are compromised.

Figure 7C:
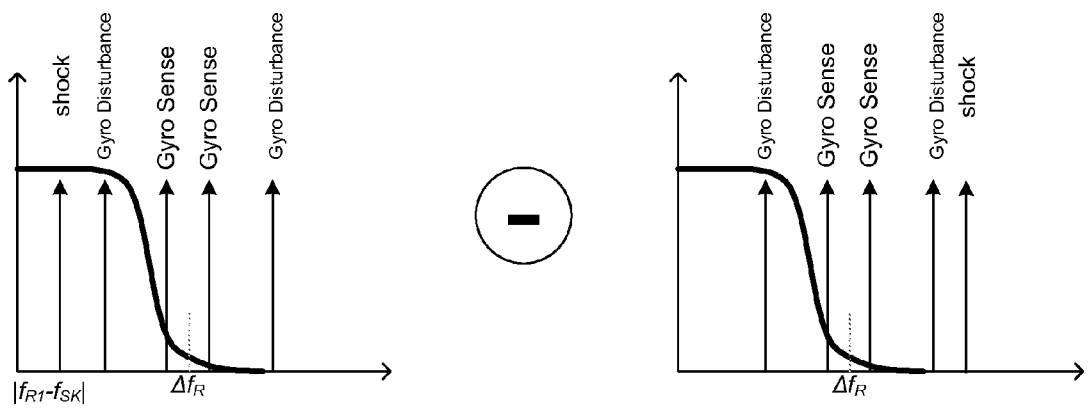
FIG. 7C illustrates an exemplary spectrum diagram that indicates a differential demodulation mechanism to separate a shock signal from gyro sense and disturbance signals a gyro output signal according to various embodiments in the invention.

FIG. 7C illustrates an exemplary spectrum diagram 760 that indicates a differential demodulation mechanism to separate the shock signal from the gyro sense and disturbance signals according to various embodiments in the invention. Due to their symmetry with respect to the characteristic frequency $f_0$, the two gyro sense signals are demodulated to two sense signals at identical frequencies $\Delta f_R \pm \Omega$ by both the first and second demodulation units 602A and 602B, except that the positions of the two demodulated sense signals are opposite in the frequency spectrum 760 of the two corresponding demodulations. Likewise, the two gyro disturbance signals are demodulated to two disturbance signals at identical frequencies $\Delta f_R \pm |f_{RD}-f_0|$, and the positions of the two demodulated gyro disturbance signals are also opposite in the frequency spectrum 760 of the two corresponding demodulations. In contrast with the gyro sense and disturbance signals, the shock signal is asymmetric with respect to the characteristic frequency $f_0$, and the demodulated shock signals respectively centers at two distinct frequencies $|f_0+\Delta f_R-f_{SK}|$ and $|f_0+\Delta f_R-f_{SK}|$ in the frequency spectrum 760 associated with the two corresponding demodulations.

Although the respective two frequencies of either the demodulated sense or disturbance signals match, their amplitudes are not necessarily so, because the gyroscope 202 that has the characteristic frequency $f_0$ and the peak frequency $f_1$ may have distinct filtering effects on the signals that are symmetric with respect to the characteristic frequency $f_0$. In accordance with some embodiments, the demodulated gyro output signals are compensated within the first and second demodulation units 602A and 602B in order to neutralize the filtering effects of the gyroscope 202. In one embodiment, such compensation is mainly obtained by tailoring the gains $G_{LP1}$ and $G_{LP2}$ for filtering in the first and second demodulation units 602A and 602B. In another embodiment, the phases $\phi_{R1}$ and $\phi_{R2}$ of the first and second reference signals are also adjusted to compensate filtering effects of the gyroscope 202. Based on such compensation, the amplitudes of the demodulated disturbance signals matches with each other and may be cancelled off by subtraction, and in some embodiments, so do the amplitudes of the demodulated sense signals.

The cut-off frequencies $f_{LP1}$ and $f_{LP2}$ are equal for filtering in the first and second demodulation units 602A and 602B. Due to differential combination in the subtractor 604, the cut-off frequencies $f_{LP1}$ and $f_{LP2}$ are relatively easier to control. In certain embodiments, both the demodulated disturbance signals and the demodulated sense signals are matched, so the cut-off frequencies $f_{LP1}$ and $f_{LP2}$ just need to be controlled between the distinct frequencies $|f_0+\Delta f_R-f_{SK}|$ and $|f_0+\Delta f_R-f_{SK}|$ of the two modulated shock signals. When the second demodulated gyro output signal is subtracted from the first demodulated gyro output signal, the modulated gyro disturbance signals and the modulated gyro sense signals automatically cancel off each other.

In one embodiment, the amplitudes of the demodulated disturbance signals are matched, while those of the demodulated sense signals are not. The cut-off frequencies $f_{LP1}$ and $f_{LP2}$ need to be better controlled below the frequencies of the demodulated sense signals, such that the uncompensated sense signals may be suppressed by filtering. Nevertheless, it is easier to control the cut-off frequencies $f_{LP1}$ and $f_{LP2}$ in such a manner than to control them between the shock signal and the demodulated disturbance signals.

Based on two differential demodulations, one shock signal in the gyro output signal is isolated, and the peak detector 304 may further determine whether this isolated shock signal exceeds the threshold level $V_{TH}$. One of those skilled in the art knows that the gyro sensing circuit 600 is effective to address the issues when the frequency of the shock signal is close to that of one gyro disturbance signal and/or that of one gyro sense signal.

In various embodiments associated with FIGS. 7A-7C, the reference signals may be selected at the two specific reference frequencies $f_{R1}$ and $f_{R2}$, and however, each of the other signals concerning the gyro sense signals and the shock signal may be associated with a respective frequency bandwidth. Regardless of their bandwidths, the gyro sense signals and the shock signal are simply represented around their respective central frequency. Like FIGS. 4A-4C and 5A-5C, heights of corresponding arrowed lines in FIGS. 7A-7C are not presented in a proportional format to the actual magnitudes of these signals.

Figure 8:
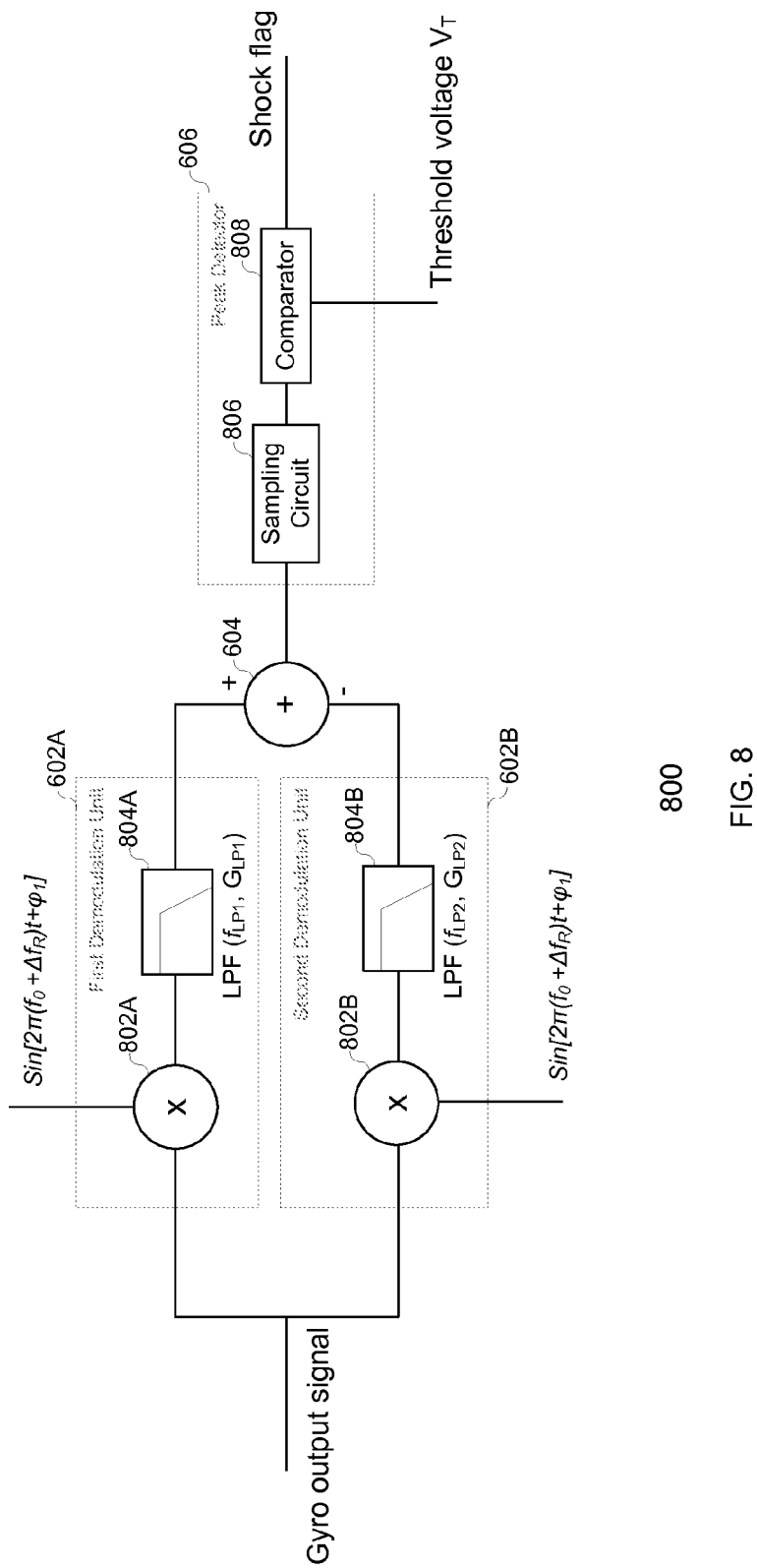
FIG. 8 illustrates another exemplary block diagram of a gyro sensing circuit based on a differential demodulation scheme according to various embodiments in the invention.

FIG. 8 illustrates another exemplary block diagram 800 of a gyro sensing circuit based on a differential demodulation scheme according to various embodiments in the invention. As an embodiment of the gyro sensing circuit 600, either of the demodulation units 602A or 602B comprises an electronic mixer and a low pass filter that are coupled to each other. The electronic mixers 802A and 802B in the demodulation units 602A or 602B mix the gyro output signal with two reference signals that adopt two distinct reference frequencies ($f_0+\Delta f_R$ and $f_0-\Delta f_R$) and two distinct phases ($\phi_{R1}$ and $\phi_{R2}$), respectively. The corresponding low-pass filters 804A and 804B further filter the respective mixed gyro output signals based on two distinct gains $G_{LP1}$ and $G_{LP2}$ but two consistent cut-off frequency $f_{LP1}$ and $f_{LP2}$. The two consistent cut-off frequency $f_{LP1}$ and $f_{LP2}$ is equal to one single frequency $f_{LP}$. In various embodiments of the invention, the phases $\phi_{R1}$ and $\phi_{R2}$ of the reference signals and/or the gains $G_{LP1}$ and $G_{LP2}$ of the filters are tailored to compensate the potentially distinct filtering effects that the gyroscope 202 have on the gyro sense and disturbance signals having frequencies higher or lower than the characteristic frequency $f_0$.

The two demodulated gyro output signals are differentially combined within the subtractor 604, such that the second demodulated gyro output signal is subtracted from the first demodulated gyro output signal to generate a combined gyro output signal. Due to compensation, the two demodulated gyro disturbance signals cancel off each other in the two demodulated gyro output signals, and in some embodiments, so do the two demodulated gyro sense signals. The demodulated shock signal is included in the combined gyro output signal and effectively isolated from the gyro sense or disturbance signals.

The following peak detector 606 comprises a sampling circuit 806 and a comparator 808. The sampling circuit 806 samples the combined gyro output signal received from the subtractor 604. The comparator 808 compares the sampled signal with the threshold level $V_{TH}$ and generates the shock flag according to a comparison result.

Figure 9A:
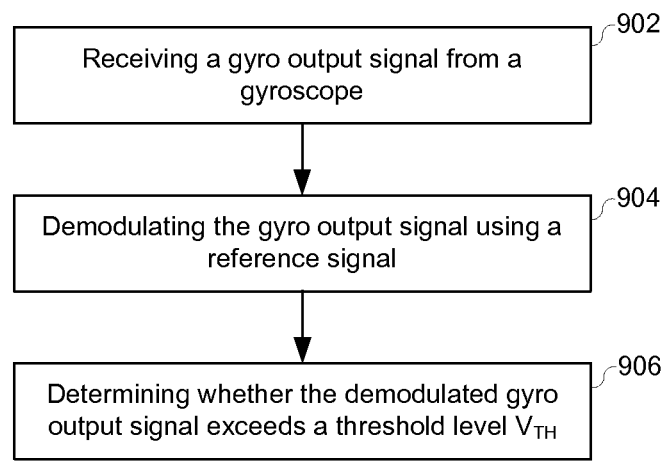
FIG. 9A illustrates an exemplary flow diagram of a method for flagging a disturbance or a shock experienced by a rotation sensing system according to various embodiments in the invention.
Figure 9B:
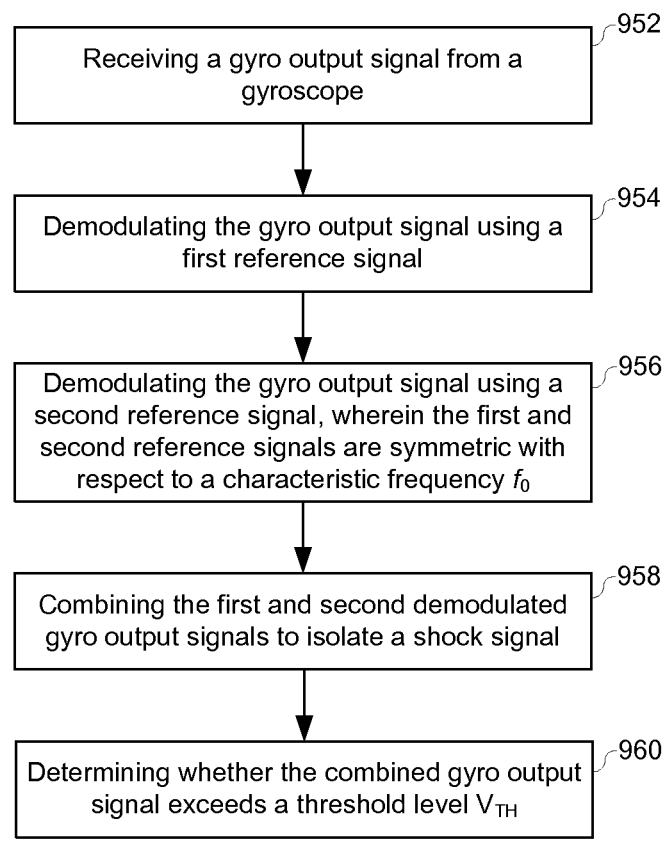
FIG. 9B illustrates another exemplary flow diagram of a method for flagging a shock experienced by a rotation sensing system according to various embodiments in the invention.

FIG. 9A illustrates an exemplary flow diagram 900 of a method for flagging a disturbance or a shock experienced by a rotation sensing system according to various embodiments in the invention. FIG. 9B illustrates another exemplary flow diagram 950 of a method for flagging a shock experienced by a rotation sensing system according to various embodiments in the invention. The methods 900 and 950 are based on a non-differential demodulation scheme and a differential demodulation scheme, respectively.

The method 900 of flagging the shock or disturbance initializes with receiving a gyro output signal from a gyroscope at step 902. Besides gyro sense signals related to an interested rate of rotation, the gyro output signal further includes the shock signal or the gyro disturbance signals.

In order to separate a shock signal or a gyro disturbance signal, such a gyro output signal is demodulated using a reference signal that has a reference frequency $f_R$ at step 904. During demodulation, the gyro output signal is mixed with the reference signal, and further band limited according to a cut-off frequency $f_{LP}$. The shock signal or the gyro disturbance signals included in the gyro output signal is therefore demodulated together with the interested gyro sense signals. In one embodiment, the shock signal exists while no gyro disturbance signals are involved, so the cut-off frequency $f_{LP}$ is set between the frequencies of the demodulated shock signal and the demodulated gyro sense signals. In another embodiment, the gyro disturbance signals are involved in the gyro output signal while no shock signal is incorporated, so the cut-off frequency $f_{LP}$ is set between the respective lower frequencies of the demodulated gyro sense and disturbance signals. In certain embodiments, both the gyro disturbance signals and the shock signal are included in the gyro output signal in addition to the gyro sense signals, and the cut-off frequency $f_{LP}$ is set between the frequency of the demodulated shock signal and the lower frequency of the demodulated gyro disturbance signals or between the respective lower frequencies of the demodulated gyro sense and disturbance signals. As a result, the demodulated shock signal or one demodulated gyro disturbance signal is retained, while the other signal components are depressed in the demodulated gyro output signal.

At step 906, it is determined whether the demodulated gyro output signal exceeds a threshold value $V_{TH}$. A shock flag is issued to a host of the rotation sensing circuit to acknowledge existence of the shock or disturbance and corruption of the gyro sense signals related to the interested rotation information.

The method 950 of flagging the shock or disturbance also initializes with receiving a gyro output signal from a gyroscope at step 952. Besides gyro sense signals related to an interested rate of rotation, the gyro output signal includes a shock signal, and may further incorporate gyro disturbance signals as well. The gyro sense and disturbance signals are symmetric with respect to the characteristic frequency $f_0$ of the gyroscope, while the shock signal is not so.

At step 954, such a gyro output signal is demodulated using a first reference signal that has a first reference frequency $f_{R1}$. At step 956, the gyro output signal is also demodulated using a second reference signal that has a second reference frequency $f_{R2}$. During either demodulation, the gyro output signal is mixed with the first or second reference signal and further band limited according to a cut-off frequency $f_{LP1}$ or $f_{LP2}$. The first and second reference signals are selected to be symmetric with respect to the characteristic frequency $f_0$. The phases of the first and second reference signals and/or the gains of band limiting are adjusted to compensate distinct filtering impacts the gyroscope has on distinct gyro sense signals or distinct gyro disturbance signals. The demodulated gyro sense signals have consistent magnitudes upon such compensation, and so do the demodulated gyro disturbance signals if they are originally incorporated.

At step 958, the first demodulated gyro output signal from step 954 is differentially combined with the second demodulated gyro output signal from step 956. In some embodiments, the gyro sense signals that are symmetric to the characteristic frequency $f_0$ are substantially cancelled off, and so are the gyro disturbance signals if they are incorporated in the gyro output signal. As a result, the combined gyro output signal includes the demodulated shock signal that is therefore isolated from the gyro sense and/or disturbance signals.

At step 960, it is determined whether the combined gyro output signal exceeds a threshold value $V_{TH}$. A shock flag is issued to a host of the rotation sensing circuit to acknowledge existence of the shock or disturbance and corruption of the gyro sense signals related to the interested rotation information.

The method 900 that is based on non-differential demodulation involves a single demodulation step, but is difficult to apply when a shock signal is close to a gyro sense signal or a gyro disturbance signal. In contrast, the method 950 involves two complementary demodulation steps and may be applied in the above challenging situation that the method 900 has difficulty to handle.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A gyro sensing circuit based on a differential demodulation scheme, comprising:
   a first demodulation unit, coupled to receive a gyro output signal from a gyroscope, the first demodulation unit demodulating the gyro output signal to a first demodulated gyro output using a first reference signal, the gyro output signal comprising a shock signal and a plurality of gyro sense signals that are related to an interested rate of rotation;
   a second demodulation unit, coupled to receive the gyro output signal, the second demodulation unit demodulating the gyro output signal to a second demodulated gyro output using a second reference signal, the first and second reference signals being symmetric with respect to a characteristic frequency of the gyroscope;
   a subtractor, coupled to the first and second demodulation units, the subtractor differentially combining the first and second demodulated gyro outputs to isolate the shock signal that is asymmetric with respect to the characteristic frequency; and
   a peak detector, coupled to the subtractor, the peak detector determining whether the combined gyro output exceeds a threshold level and generating a shock flag to alert a host whether an anomalous shock or disturbance situation occurs.

2. The gyro sensing circuit according to claim 1, wherein the plurality of gyro sense signals are symmetric with respect to the characteristic frequency and suppressed by the differential combination process in the subtractor.

3. The gyro sensing circuit according to claim 1, wherein the gyro output signal further comprises a plurality of gyro disturbance signals that are related to a disturbance to mechanical performance of the gyroscope and thus symmetric with respect to the characteristic frequency, the plurality of gyro disturbance signals being also suppressed by the differential combination process in the subtractor.

4. The gyro sensing circuit according to claim 3, wherein the shock signal is substantially close in the frequency spectrum to at least one signal among the plurality of the gyro disturbance signals and the plurality of the gyro sense signals.

5. The gyro sensing circuit according to claim 3, wherein at least one signal of the shock signal, the plurality of gyro sense signals and the plurality of gyro disturbance signals is associated with a frequency bandwidth.

6. The gyro sensing circuit according to claim 1, wherein the first and second reference signals are associated with a first phase and a second phase, respectively, and the first and second phases are configured to neutralize distinct filtering effects that the gyroscope has on signals that are symmetric with respect to the characteristic frequency.

7. The gyro sensing circuit according to claim 1, wherein a frequency of at least one of the first and second reference signals is selected to be closer to the frequency of the shock signal than to a respective frequency that each of the plurality of gyro sense signals has.

8. The gyro sensing circuit according to claim 1, wherein the first demodulation unit further comprises:
   a first electronic mixer that combines the first reference signal and the gyro output signal and varies spectrum content of the gyro output signal with respect to a first reference frequency of the reference signal; and
   a first low-pass filter, coupled to the first electronic mixer, the first low-pass filter adopts a first filter gain and a first cut-off frequency that are configured to allow the first low-pass filter to process the plurality of gyro sense signals and the shock signal differently.

9. The gyro sensing circuit according to claim 8, wherein the second demodulation unit further comprises:
   a second electronic mixer that combines the second reference signal and the gyro output signal and varies spectrum content of the gyro output signal with respect to a second reference frequency of the reference signal; and
   a second low-pass filter, coupled to the second electronic mixer, the second low-pass filter adopts a second filter gain and a second cut-off frequency that are configured to allow the second low-pass filter to process the plurality of gyro sense signal and the shock signal differently.

10. The gyro sensing circuit according to claim 9, wherein the first gain and the second gain are configured to neutralize distinct filtering effects that the gyroscope has on signals that are symmetric with respect to the characteristic frequency.

11. A method of flagging a shock in an output of a gyroscope, comprising the steps of:
   receiving a gyro output signal from the gyroscope, the gyro output signal comprising a shock signal and a plurality of gyro sense signals that are related to an interested rate of rotation;
   demodulating the gyro output signal to a first demodulated gyro output using a first reference signal;
   demodulating the gyro output signal to a second demodulated gyro output using a second reference signal, the first and second reference signals being symmetric with respect to a characteristic frequency of the gyroscope;
   differentially combining the first and second demodulated gyro outputs to isolate the shock signal that is asymmetric with respect to the characteristic frequency; and
   determining whether the combined gyro output exceeds a threshold level.

12. The method according to claim 11, wherein the gyro output signal further comprises a plurality of gyro disturbance signals that are related to a disturbance to mechanical performance of the gyroscope and thus symmetric with respect to the characteristic frequency, the plurality of gyro disturbance signals being also suppressed by the differential combination process in the subtractor.

13. The method according to claim 12, wherein the shock signal is substantially close in the frequency spectrum to at least one signal among the plurality of the gyro disturbance signals and the plurality of the gyro sense signals.

14. The method according to claim 11, wherein the first and second reference signals are associated with a first phase and a second phase, respectively, and the first and second phases are configured to neutralize distinct filtering effects that the gyroscope has on signals that are symmetric with respect to the characteristic frequency.

15. The method according to claim 11, wherein a frequency of at least one of the first and second reference signal is selected to be closer to the frequency of the shock signal than to a respective frequency that each of the plurality of gyro sense signals has.

16. The method according to claim 11, wherein either of the two demodulation steps comprising a first sub-step of mixing the gyro output signal with a respective reference signal and a second sub-step of weighted filtering of the mixed gyro output signal with a respective filter gain.

17. A gyro sensing circuit, comprising:
   a demodulation unit, coupled to receive a gyro output signal that comprises a gyro sense signal and at least one of a shock signal and a plurality of gyro disturbance signals from a gyroscope, the demodulation unit demodulating the gyro output signal to a demodulated gyro output using a reference signal, such that the at least one of the shock signal and the plurality of gyro disturbance signals is retained while the gyro sense signal that is related to an interested rate of rotation is suppressed; and a peak detector, coupled to the demodulation unit, the peak detector determining whether the demodulated gyro output exceeds a threshold level and generating a shock flag to alert a host whether an anomalous shock or disturbance situation occurs.

18. The gyro sensing circuit according to claim 17, wherein the demodulation unit further comprises:

an electronic mixer that combines the reference signal and the gyro output signal and varies spectrum content of the gyro output signal with respect to a reference frequency of the reference signal; and a low-pass filter, coupled to the electronic mixer, the low-pass filter adopts a filter gain and a cut-off frequency that are configured to allow the low-pass filter to process the gyro sense signal and the at least one of the shock signal and the plurality of gyro disturbance signals differently.

19. The gyro sensing circuit according to claim 17, wherein the frequency of the gyro sense signal is associated with a characteristic frequency of the gyroscope and a frequency of a rotational rate that the gyroscope is used to detect.

20. The gyro sensing circuit according to claim 17, wherein the frequency of the reference signal is selected to be closer to a first frequency of the at least one of the shock signal and the plurality of gyro disturbance signals than a second frequency of the gyro sense signal, and in addition, needs to be sufficiently far from a peak frequency of the gyroscope.

\* \* \* \* \*